United States Patent [19]

Matsumoto

[11] Patent Number: 5,325,352
[45] Date of Patent: Jun. 28, 1994

[54] RECORDING OF MASTERING INFORMATION FOR PERFORMING A DISC MASTERING PROCESS

[75] Inventor: Seiji Matsumoto, Hamamatsu, Japan

[73] Assignee: Yamaha Corporation, Hamamatsu, Japan

[21] Appl. No.: 959,725

[22] Filed: Oct. 13, 1992

[30] Foreign Application Priority Data

Oct. 14, 1991 [JP] Japan ............... 3-293563

[51] Int. Cl.⁵ ............................................ G11B 27/00
[52] U.S. Cl. ........................ 369/275.1; 369/32; 369/83; 369/84; 369/275.3
[58] Field of Search ............. 369/275.1, 48, 59, 32, 369/83, 84, 275.3

[56] References Cited

U.S. PATENT DOCUMENTS

| | | | |
|---|---|---|---|
| 5,012,461 | 4/1991 | Yoshida et al. | 369/32 |
| 5,124,963 | 6/1992 | Ando | 369/32 |
| 5,142,521 | 8/1992 | Terashima et al. | 369/32 |
| 5,148,422 | 9/1992 | Sako et al. | 369/44.26 |
| 5,150,339 | 9/1992 | Ueda et al. | 369/32 |
| 5,153,861 | 10/1992 | Maeda et al. | 369/32 |
| 5,177,720 | 1/1993 | Kondo | 369/32 |

*Primary Examiner*—Paul M. Dzierzynski
*Assistant Examiner*—Kim-Kwok Chu
*Attorney, Agent, or Firm*—Spensley, Horn Jubas & Lubitz

[57] ABSTRACT

In a writable optical disc such as a CD-WO and CD-MO having a program area where, by using a recording format capable of recording data in the form of a main code and a subcode, program information is recorded in the form of the main code and control information thereof is recorded in the form of the subcode and also a lead area formed adjacent to the program area where information constituting a table of contents (TOC) only which is extracted from the control information is recorded in the form of the subcode, data for mastering the information recorded on the optical disc is recorded in the form of the main code in at least a part of the lead area.

8 Claims, 3 Drawing Sheets

RECORDING OF MASTERING INFORMATION FOR PERFORMING A DISC MASTERING PROCESS

BACKGROUND OF THE INVENTION

This invention relates to recording of data on an optical disc on which additional writing is possible e.g., Compact Disc Write Once (hereinafter referred to as "CD-WO") and on an optical disc from which recorded data is erasable, e.g., Compact Disc Magneto-Optical (hereinafter referred to as "CD-MO") and, more particularly, to recording of mastering auxiliary information necessary for performing a mastering processing in a large scale production of discs after making a recorded disc.

In a case where program information has been written experimentally on a writable disc such as a CD-WO or a CD-MO and thereafter a recorded disc has finally been completed through processes such as assessing and debugging, a large scale production of discs in the form of, e.g., a Compact Disc, based on the contents of the recorded disc is generally made. In a mastering process in the large scale production, various subcode information used for mastering such as TOC (table of contents) information and subcode information and user's bit to be recorded on a program area is recorded as mastering auxiliary information on a recording medium such as a floppy disc, a Bernoulli type disc (i.e., hard disc) or a magnetic tape separately from the recorded disc and this recording medium is transferred with the recorded disc to the mastering process.

In a Compact Disc or CD-WO, as shown in FIGS. 4 and 5, a train of recording pits is spirally formed with a track pitch of 1.6 μm on a disc having an outer diameter of 120 mm$\phi$, a central opening diameter of 15 mm$\phi$ and thickness of 1.2 mm consisting of and three areas of a lead-in area Li, a program area Pg and a lead-out area Lo are formed from the inner periphery side by the train of recording pits to enable signals to be recorded in the respective areas. The program area Pg is an area (program area) where program information and subcode information are recorded whereas the lead-in area Li and the lead-out area Lo are areas (lead areas) where information such as TOC information which relates to a table of contents extracted from subcode information used for control of the disc is recorded.

In the lead-in area Li, TOC information representing contents of the program recorded in the disc is recorded in the subcode form. In the case of a disc containing a musical program, for example, TOC includes information such as the number of music pieces included in the disc, addresses on the disc of the beginning, end and intermediate break of each music, time for each music and total time of all music contained in the disc. The lead-in area Li is an area beginning from the innermost part of the recording area of the disc and continuing to a position immediately before the start point of the program area Pg, e.g., an area extending normally from a position of a diameter of 44.7 mm$\phi$ which is inside of a position of a diameter of 46 mm$\phi$ to the program start position. In this lead-in area Li, TOC information is repeatedly recorded. In most Compact Discs, the number of music and the total performance time of the disc are displayed upon loading of the disc in a Compact Disc player. This displayed information is obtained by reading TOC information upon loading of the disc. The TOC information is also ustilized for selecting a particular music in the disc. In the lead-in area Li, a main channel is vacant and data "0" is normally stored.

In the program area Pg, program information such as music signals and subcode information for the control purpose are recorded.

In the lead-out area Lo, a signal representing the end of the program is recorded. The lead-out area Lo is an area which, for example, extends from the end position of the program area Pg to a postion which is at least 0.5 mm outside in the radial direction (up to a maximum diameter of 117 mm$\phi$). In the lead-out area Lo, lead-out information consisting of repeating pulses of 2 Hz is recorded. The program area Pg therefore is defined by the program start position of the diameter of 50 mm$\phi$ and the program end position (up to the maximum diameter of 116 mm$\phi$). A main channel of the lead-out area also is normaly "0".

A recording format used in a case where a normal music source is recorded in a Compact Disc will now be described. The spiral recording track consisting of the train of pits is divided into blocks frame by frame and each frame consists, as shown in FIG. 6, of a synchronizing signal, a subcode, a program information bit, and alternate repetition of an error correction bit and a program information bit. The synchronizing signal of FIG. 6 is a frame synchronizing signal which is inserted at the start point of each frame. As the subcode, one byte is inserted for one frame and a predetermined subcode frame is constructed of a subcode ranging over plural frames. The subcode is also called control information which includes various information for control of the disc and information enabling the user to use the disc easily. As the subcode, eight channels of P, Q, R, S, T, U, V and W channels are defined. In the narrow sense of the term, the P and Q channels are sometimes called a subcode and the R-W channels are called user's bits. The program information bit is program information itself consisting of information such as digital audio information of a music to be recorded. The error correction bit is data for correcting an error to the program information. The code portion other than the synchronizing signal and the subcode in each frame constitutes a main channel which is a recording channel for main information such as a program to be recorded. In this example, the code portion of the program information bit, error correction bit, program information bit and error correction bit constituting the main channel will be called a main code. In the case of normal recording of digital audio information of a Compact Disc, as shown in FIG. 7, audio signal data of a left channel L and a right channel R each having 2 bytes are alternately recorded in the program information bits of the main channel.

In manufacturing a Compact Disc, it is a normal practice to produce a digital master tape which was recorded program information to be recorded into a Compact Disc, insert subcodes such as P and Q in the program information of the digital master tape, apply TOC information as table-of-contents information obtained from these subcodes to be recorded in the lead-in area Li and apply information to be recorded in the lead-out area Lo, thus producing a Compact Disc tape master including all information to be recorded in a Compact Disc. A glass master is then produced by applying laser cutting to a glass master original disc on the basis of the Compact Disc tape master and then a metal master, a metal mother and a stamper are sequentially made on the basis of the glass master. Transparent discs are produced in a large scale by pressing using this stamper (e.g., by injection compression forming). Compact Discs are completed by forming a reflecting film and protective film on each disc.

When a complete disc has been produced by assessing and debugging a disc produced as a CD-WO by using a disc recording system for a CD-WO and by reproducing, when necessary, a corrected disc, Compact Discs are produced in a large scale by using the completed disc as a master disc. In this case, when mastering, i.e., production of a Compact Disc master, is performed by using only a CD-WO, there is likelihood that information such as TOC and subcode, user's bit recorded in the subcode form becomes data containing much error due to poor forming of the CD-WO pits. For this reason, it was necessary in the past in mastering of a Compact Disc to record mastering auxiliary information necessary for mastering including TOC, subcode and user's bit etc. in a floppy disc, magnetic tape or other recording medium separately from the CD-WO. In other words, in mastering of a Compact Disc from a CD-WO, a recording medium such as a floppy disc or a magnetic tape on which mastering auxiliary information such as TOC, subcode and user's information is recorded must be transferred with the recorded CD-WO to the mastering process. In the mastering process, a master is made according to a predetermined format on the basis of these information. This preparation of extra recording medium containing mastering auxiliary information is a troublesome process.

It is, therefore, an object of the invention to provide an optical disc, and a method and a device for recording data on an optical disc which simplify the work and protocol for performing a mastering of a Compact Disc or the like from a writable optical disc and yet enables an accurate mastering.

SUMMARY OF THE INVENTION

For achieving the object of the invention, there is provided an optical disc being writable by using a recording format, the recording format comprising a main code and a subcode, the optical disc comprising a program area where program information is recorded in the form of the main code and control information for controlling reproduction of the optical disc is recorded in the form of the subcode, the control information including table information representing a table of contents of the program information in the form of the subcode, a lead area formed adjacent to the program area where table information representing the table of contents of the program information is recorded in the form of the subcode and mastering data for mastering the information recorded on the optical disc is recorded in the form of the main code.

There is also provided a method for recording data on an optical disc which is writable by using a recording format, the recording format comprising a main code and a subcode, and the optical disc having a program area and a lead area as a writable area, the optical disc recording method comprising the steps of recording in the program area program information in the form of the main code and control information for controlling reproduction of the optical disc in the form of the subcode, recording in the lead area a part of control information in the form of the subcode, the part of control information being table information representing a table-of-contents of the program information, generating mastering auxiliary information necessary for performing mastering of the optical disc on the basis of the control information, holding the mastering auxiliary information, and recording the mastering auxiliary information held by the auxiliary information holding means in the form of the main code in the lead area.

There is also provided a optical disc recording device for recording data on an optical disc which is writable by using a recording format, the recording format comprising a main code and a subcode, and the optical disc having a program area and a lead area as a writable area, the optical disc recording device comprising, first recording control means for recording in the program area program information in the form of main code and control information for controlling reproduction of the optical disc in the form of the subcode, and for recording in the lead area at least a part of control information in the form of the subcode, the part of control information being table information representing a table-of-contents of the program information, auxiliary information holding means for generating mastering auxiliary information necessary for performing mastering of the optical disc on the basis of the control information, and for holding the mastering auxiliary information, and second recording control means for recording the mastering auxiliary information held by the auxiliary information holding means in the form of the main code in the lead area.

According to the invention, in recording data in an optical disc which is writable at least once and comprising a program area where, by using a recording format capable of recording data in the form of a main code and a subcode, program information is recorded in the form of the main code and control information thereof is recorded in the form of the subcode, and a lead area formed adjacent to the program region where information constituting a table of contents only which is extracted from the control information is recorded in the form of the subcode, data for mastering the information recorded on the optical disc is recorded in the main code form in at least a part of the lead region. In mastering, the mastering auxiliary information such as TOC, subcode, user's bit etc. recorded in the main code form in the lead area is read out and mastering is performed with accurate information containing little error. According to the invention, a recorded optical disc has only to be transferred to the mastering process without the necessity for providing other recording medium, so that accurate mastering can be achieved in a much simpler process than in the past.

Preferred embodiments of the invention will be described with reference to the accompanying drawings.

BRIEF DESCRIPTION OF THE DRAWINGS

In the accompanying drawings.

DESCRIPTION OF PREFERRED EMBODIMENTS

Figure 1:
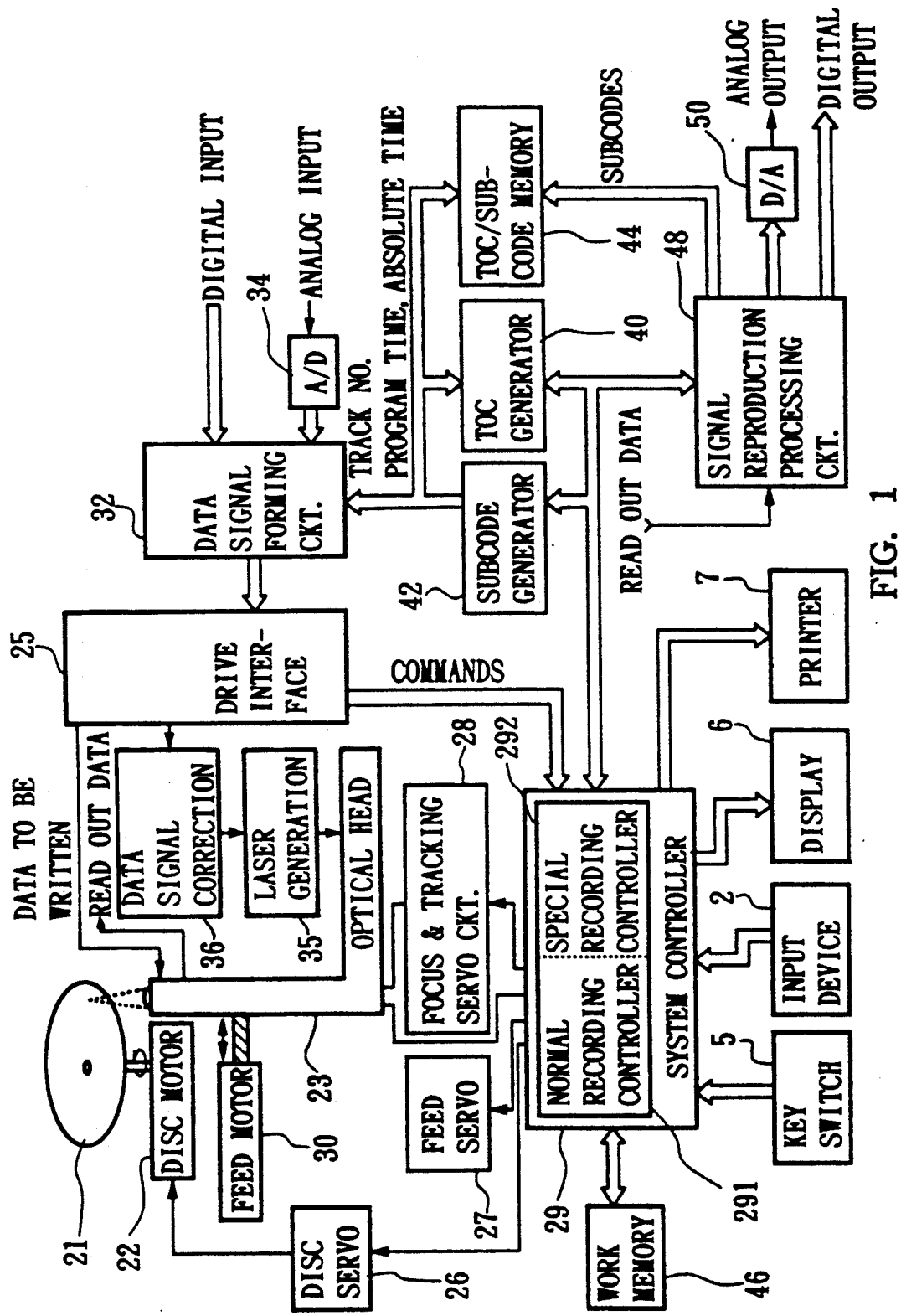
FIG. 1 is a block diagram showing an embodiment of an optical disc recording and reproducing device according to the invention.

In FIG. 1, an optical disc 21, e.g., a CD-WO, is driven and rotated in the direction of the arrow by a disc motor 22. The rotation velocity of the disc motor 22 is controlled to a constant linear velocity by a disc servo circuit 26. The rotation velocity of the disc motor 22 in this case is calculated by a system controller 29 in accordance with position information of an optical head 23.

The optical head 23 includes unillustrated semiconductor laser, optical system, focus actuator, tracking actuator and four-split photo-diode and laser beam is irradiated by the optical head 23 on the surface of the optical disc 1 to write data on a recording pit and to read data therefrom.

A focus and tracking servo circuit 28 performs, in response to a command from a system controller 29, focusing and tracking controls of laser beam irradiated from the semiconductor in the optical head 23. In the tracking control, a guide groove formed in the optical disc 21 is detected to control the optical head 23 so that the laser beam spot of the optical head 23 follows the guide groove. A feed servo circuit 27 drives a feed motor 30 in response to a command from the system controller 29 to move the optical head 23 in the radial direction of the optical disc 21.

An input signal to be recorded on the optical disc 21 is applied directly to a data signal forming circuit 32 when the input signal is a digital signal and to the data signal forming circuit 32 through an analog-to-digital converter 34 when the input signal is an analog signal. Sampling frequency and data bit number of the input data are in conformity, for example, to the Compact Disc standard.

A TOC generator 40 generates TOC information as a table-of-contents information of program information during writing of the program information or upon completion of writing to have this TOC information stored once in a TOC/subcode memory 44. The TOC information stored in the TOC/subcode memory 44 is read out after confirmation and correction of the start time of the program to be described later has been performed.

A subcode generator 42 produces and outputs, responsive to a timing signal provided by the system controller 29 in response to a key input by operation of an input device 2 or a key switch 5, subcode information such as a track number, index number, program time and absolute time during recording of the program information. The output subcode information is sequentially stored in the TOC/subcode memory 44.

The data signal forming circuit 32 applies interleaving to the input data and imparts a subcode and error check code to the input data and forms and outputs a series of serial data with a format and transfer rate adapted to a Compact Disc by EFM (eight-to-fourteen modulation). Further, the data signal forming circuit 32 forms the TOC information read from the TOC/subcode memory 44 into a predetermined format and outputs this data.

Commands including start of recording, stop of recording, registration of TOC and recording of TOC which are generated by the key input operation in the input device 2 are supplied to the TOC generator 40, subcode generator 42 and TOC/subcode memory 44 through the system controller 29.

The output data of the data signal forming circuit 32 is applied to a data signal correction circuit 36 through a drive interface 25. The data signal correction circuit 36 corrects a data error signal in its waveform caused by the heat accumulating effect of laser beam in accordance with the bit correspondence length and immediate blank correspondence length of the data signal. More specifically, the data signal correction circuit 36 reduces difference in positions between the data signal timing which occurs due to the heat accumulated effect of laser beam and the recording pit and blank by increasing or decreasing the data signal timing and also prevents increase in the recorded bit width by dividing the data signal timing.

The output data of the data signal correction circuit 36 is applied to a laser generation circuit 35. The laser generation circuit 35 irradiates the semiconductor laser beam in the optical head 23 on the recording surface of the optical disc 21 to effect recording. In this manner, data is recorded on the optical disc 21 with a format, transfer velocity and linear velocity conforming to the Compact Disc standard.

The TOC/subcode memory 44 successively stores, in synchronization with the writing operation on the optical disc 21 as described before, the track number, index number and time code information such as program time and absolute time produced by the subcode generator 42 and also stores input information such as alphabets and numerical values applied from the input device 2 thereby forming and holding information (TOC) to be finally written in the lead-in area Li. Therefore, the TOC/subcode memory 44 constitutes auxiliary information holding means for storing and holding all of TOC, subcode and user's bit necessary for mastering according to the invention. The TOC/subcode memory 44 is required to be of a relatively large capacity and, therefore, it may be constructed of an external memory such as a floppy disc or Bernoulli type disc. The TOC/subcode memory 44 may also be used for storing TOC information read from the lead-in track of the optical disc when the program information is read out.

A signal reproduction processing circuit 48 EFM-demodulates and decodes the data read from the optical disc 21 by the optical head 23 and reads also the subcode information.

In the signal reproduction processing circuit 48, the decoded program information is provided directly as a digital signal or an analog signal after being converted by a digital-to-analog converter 50. The subcode information which has been read by the signal reproduction processing circuit 48 is supplied when necessary to the TOC/subcode memory 44 and stored therein.

A work memory 46 is used for temporarily storing contents of arithmetic operation and transient status of such arithmetic operation accompanying data processing in the respective component parts of the device and also for data stacking during interruption of recording.

The data signal forming circuit 32 performs forming and EFM of data signals. More specifically, the data signal forming circuit 32 applies interleaving to the input data and imparts to the input data subcodes and error check code etc. supplied from the subcode generator 42 thereby forming signal data. Then the data signal forming circuit 32 applies EFM to the signal data and causes this data to be written in the optical disc 21 through the drive interface 25, optical head 23 etc. Further, when a key input for recording of TOC has been given upon completion of recording of the program information and necessary correction of TOC information, the data signal forming circuit 32 forms the TOC information read from the TOC/subcode memory 44 into a predetermined format and, after imparting error check code etc. and applying EFM, causes the data to be written in the optical disc 21 through the drive interface 25 and optical head 23 etc.

The signal reproduction processing circuit 48 performs EFM demodulation, decoding and reading of subcodes. After EFM demodulation the data read from the optical head 23, the signal reproduction processing circuit 48 decodes the EFM demodulated data and reads TOC information and subcode information from decoded data. The signal reproduction processing circuit 48 provides the program data as its output signal also supplies the TOC information and, when necessary, subcode information to the TOC/subcode memory 44 for storing these information therein.

The system controller 29 includes, as a controller for recording on the optical disc 21, a normal recording controller 291 (first recording control means) for controlling recording of normal program information, subcode and user's bit in the program area Pg, lead-in area Li and lead-out area Lo and a special recording controller 292 for controlling recording of a mastering auxiliary information main code in the lead-in area Li or the lead-out area Lo which is peculiar to the present invention. The normal recording controller 291 performs a control for recording the program information in the main code form and normal subcode and user's bit in the subcode form in the program area Pg, a control for recording the TOC information in the subcode form in the lead-in area Li and a control for recording predetermined data in the lead-out area Lo. The special recording controller 292 performs a control for recording the TOC information and subcode and user's bit in the main code form in the same manner as in recording of the program information in the lead-in area Li or the lead-out area Lo as will be described more fully later. Besides the above described function, the system controller 29 has, as has already been described before, a function of performing a control for reproducing data from the optical disc 21.

The operation of the above described embodiment of the optical disc recording and reproduction device will now be described.

Before describing a specific operation of the device, the basic principle of the present invention will be described.

In the prior device, TOC information is repeatedly recorded in the subcode form in a lead-in area Li of an optical disc such as a Compact Disc and a CD-WO and in this lead-in area Li, a main channel for recording a main code is not used (specifically, data "0" is recorded as representing vacancy of the main channel). Therefore, in playing back a disc by a Compact Disc player, a CD-ROM reader or a CD-I player, the main channel of the lead-in area Li is ignored. Accordingly, if some information is recorded in this main channel of the lead-in area Li, no particular problem will be posed in the normal use of the Compact Disc player or the like.

Since the main channel of the lead-in area Li originally is an area for recording program information, it has a capacity sufficient for storing a large amount of data. According to the invention, mastering auxiliary information necessary for mastering, i.e., TOC information and subcode information of the P-channel and Q-channel for the entire disc and further, if necessary, user's bit information from the R-channel to the W-channel for the entire disc, is recorded in the main channel of the lead-in area Li. The main channel of the lead-in area Li has a sufficient capacity to realize this. The TOC information and the subcode information of the P-channel and Q-channel include, for example, track or music number information, index information, mute information between music pieces, time information representing, e.g., start and end of a music, program contents information indicating whether the program is music or other data, and copyright information. The user's bit information include, for example, graphics recording information and information for recording CD-MIDI information for music (amounting to 20M bytes to 25M bytes).

Figure 2:
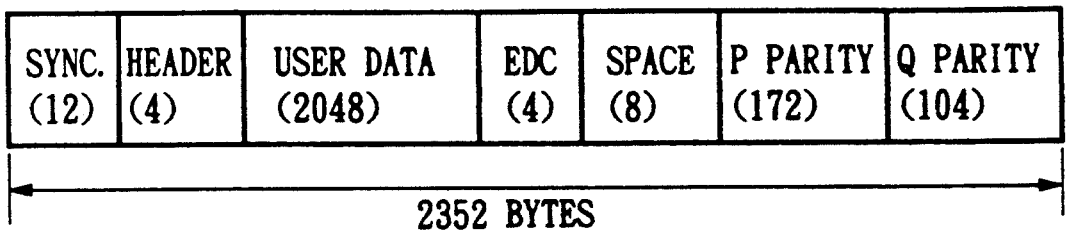
FIG. 2 is a diagram for describing an example of a recording format of mastering auxiliary information used in the embodiment of FIG. 1.
Figure 3:
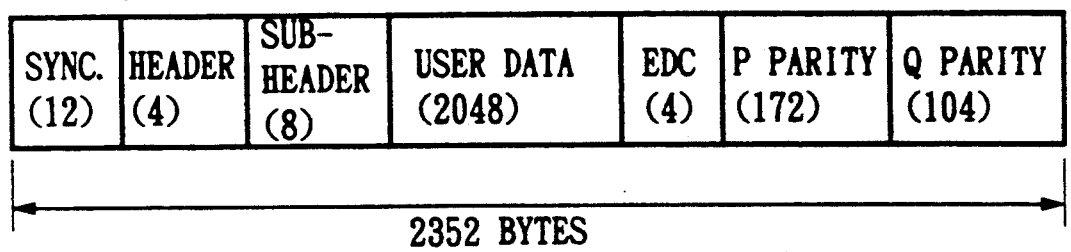
FIG. 3 is a diagram for describing another example of a recording format of mastering auxiliary information used in the embodiment of FIG. 1.
Figure 6:
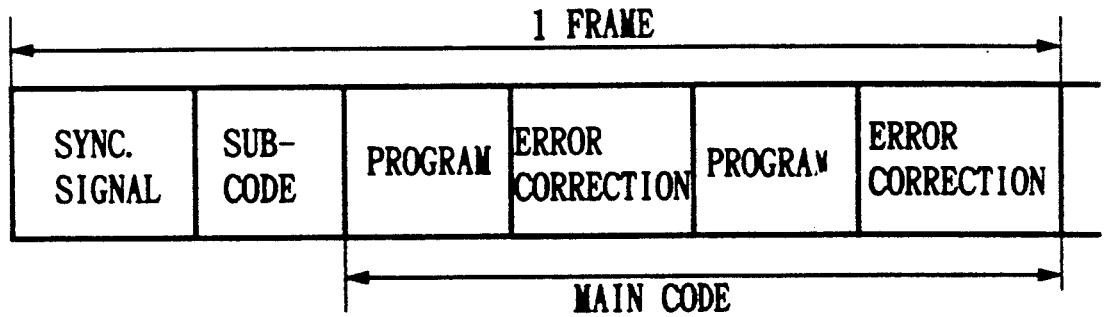
FIG. 6 is a diagram for describing a recording format of a typical Compact Disc.
Figure 7:
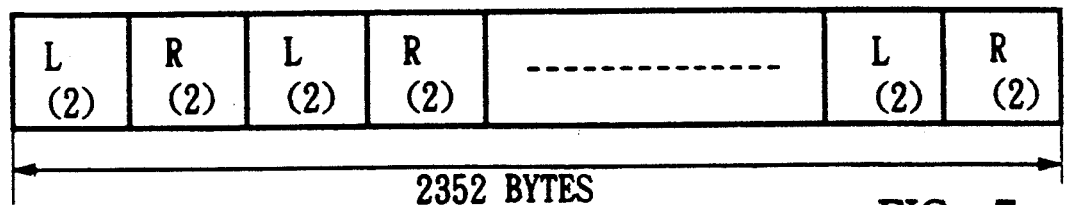
FIG. 7 is a diagram for describing a recording format of a main channel in a case where a common musical source is recorded in a Compact Disc.
Figure 4:
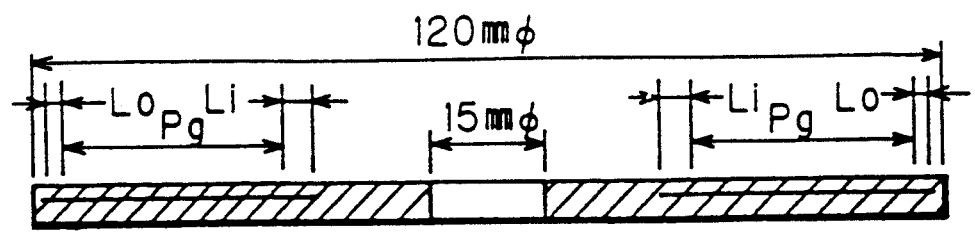
FIG. 4 is a schematic sectional view for describing the recording area of a typical Compact Disc.
Figure 5:
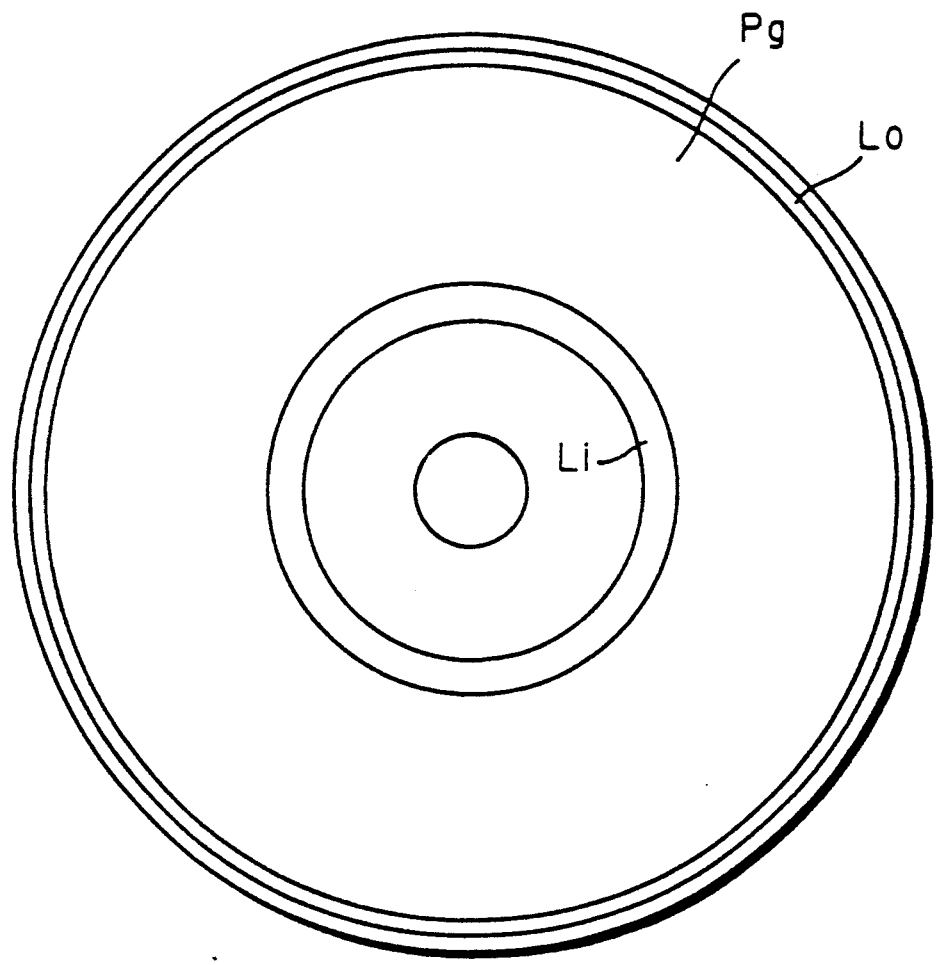
FIG. 5 is a schematic plan view for describing the recording area of the typical Compact Disc.

As the recording format, a recording format which enables recording of digital data with sufficient error checking function may be used. For example, a format according to the mode 1 of the CD-ROM as shown in FIG. 2 or the mode 2, form 1 of the CD-ROM as shown in FIG. 3 may be used. The formats shown in FIGS. 2 and 3 include synchronizing data, header (sub-header), user data, EDC data for performing detection and correction of an error in a data portion consisting of user data, and P and Q parity data which are vertical and inclined parities about a data portion consisting of the header (sub-header) and user data. These formats are sufficient for performing accurate detection and correction of errors and thereby improving reliability of data.

The diameter of the innermost periphery of a recording area of a CD-WO, i.e., the diameter of the innermost periphery of the lead-in area Li, is 44.7 mm $\phi$ which is sufficient for recording of normal mastering auxiliary information. When the amount of mastering auxiliary information to be recorded is extremely large, the lead-in area of a CD-WO disc may be enlarged inwardly to a necessary extent. For example, the inner diameter of the recording area may be enlarged to about 44/2 mm for recording. In this case, the recording capacity becomes more than 30M bytes.

The operation of the embodiment of the optical disc recording and reproducing device adopting the above described basic principle will be described below.

There are two recording methods. In the case of recording in a CD-ROM, there is a frequently used method according to which all program information to be recorded is previously processed by, e.g., a signal processing circuit of the recording device or a separately provided computer and the program information, subcode information and user's bit and final TOC information for the entire disc are all prepared beforehand, and further these information are written all at once in the lead-in area Li and the lead-out area Lo of the disc. The operation in this case will be briefly described. First, required subcode, user's bit and TOC information are prestored in the TOC/subcode memory 44. Then, recording in the lead-in area Li is started. In this case, the system controller 29 gives to the data signal forming circuit 32, through the normal recording controller 291, a command for producing data for repeatedly recording TOC information from the TOC/subcode memory 44 in the subcode form and also gives to the data signal forming circuit 32, through the special recording controller 292, a command for producing data for recording all data of the TOC/subcode memory 44 in the main code form. By this operation, in the lead-in area Li, the TOC information is recorded in the subcode form and the mastering auxiliary information is recorded in the main code form in the same manner as in recording program information. Then, in recording in the program area Pg, subcode and user's bit information is read from the TOC/subcode memory 44 through the normal recording controller 291 and in synchronism with program data which is separately supplied. Then recording in the program area Pg is performed in a normal manner through the normal recording controller 291. Thereafter, recording in the lead-out area Lo is made through the normal recording controller 291 only when the recording is a normal recording. When mastering auxiliary information is to be recorded in the lead-out area according to necessity, both the normal recording controller 291 and the special recording controller 292 are operated to perform necessary recording in the lead-out area Lo.

In the case of a music signal recorder, for example, there is another method according to which music pieces are recorded successively one after another and not all at once. This is an additional type recording. Since, in this case, final TOC information and subcode and user's bit for the entire disc are not obtained unless all recording program processing has been completed, the writing operation in the lead-in area becomes a last step. The operation in this case will be now described. An unrecorded optical disc 21 is set in a disc tray 4 and the input device 2 or the key switch 5 is operated. By the control of the normal recording controller 291 of the system controller 29, recording from the first music piece is started. In this case, when the optical head 23 has reached a start point of the program area Pg, the subcode generator 42 starts the program time and the absolute time and generates subcodes with the track number "01". These subcodes are sequentially accumulated in the TOC/subcode memory 44.

A subcode which represents the position of the head of the first music among the subcodes generated by the subcode generator 42 is supplied to the TOC/subcode memory 44 and stored therein through the system controller 29 and the TOC generator 40 for use as the TOC information.

The program information and the subcode information provided by the subcode generator 42 are applied to the data signal forming circuit 32. The data signal forming circuit 32 generates a signal of a predetermined format including subcodes, input data which has been subjected to interleaving and an error check code. This signal is EFM modulated and then is supplied as data to be written to the optical head 23 through the drive interface 25. Thus, the program of the first music piece is recorded in the disc.

When a temporary stop key or a stop key of the input device 2 or the key switch 5 has been depressed, the recording operation is interrupted or stopped. At this time, contents of work data in the respective parts of the device are transferred to the work memory 46 through the system controller 29 and stored in the work memory 46. Upon resuming of the recording operation, data of contents existing immediately before the interruption is loaded from the work memory 46 to the respective parts of the device to resume the recording operation. Thereafter, the same operation is repeated each time the recording operation is started, interrupted or stopped.

In this embodiment, when a print key in the input device 2 or the key switch 5 has been depressed, data regarding the interruption among data stored in the work memory 46 is printed out by a printer 7. A time code table can also be printed out on the basis of contents of the TOC information.

Upon completion of recording of all music pieces on the optical disc 21, the operation for writing the TOC information is started. At this time, start time (X minute, X second, X frame) of the program of each music piece and all subcodes and user's bit have been recorded in the TOC/subcode memory 44 on the basis of the preceding recording operation. In accordance with data in the TOC/subcode memory 44, the controls by the normal recording controller 291 and the special recording controller 292 are performed in the same manner as described before whereby the TOC information in the subcode form and the mastering auxiliary information in the main code form are recorded in the lead-in area Li of the optical disc 21. Recording in the program area Pg is made in the normal manner.

The recorded optical disc 21 is entirely the same as an ordinary Compact Disc except for the data recorded in the main code form in the lead-in area Li. Since the mastering auxiliary data can be ignored in a normal playback, this optical disc 21 can be played back in the same manner as a normal Compact Disc.

Upon debugging this optical disc thus produced and confirming that this disc is a complete one, mastering is performed on the basis of this disc for a large scale production. In this case, the mastering auxiliary information such as TOC and subcode information which is recorded in the main channel of the lead-in area Li is read out and used for supplying subcodes, user's bit and TOC information used in mastering. Since data in the main channel has been subjected to the error correction processing of a high accuracy, mastering auxiliary information of a quality which is not second to, but even higher than, mastering data supplied by the conventional method can be obtained.

In performing mastering for producing Compact Discs, therefore, the necessity for providing a recording medium such as a floppy disc or a magnetic tape in which mastering auxiliary information is recorded is obviated and all information can be supplied only by an optical disc such as a CD-WO, so that the mastering work is facilitated and efficiency in mastering is improved.

The invention is not limited to the illustrated embodiment but may be carried out in various modified forms. For example, mastering auxiliary information may be recorded in the lead-out area Lo. In a case where a disc has only the lead-in area Li or the lead-out area Lo but has another non-program area, the invention may be applied by utilizing this non-program area.

The above description has been made about the Compact Disc Standard. The invention is applicable also to any disc having a similar format including the lead-in area Li, program area Pg and lead-out area Lo.

What is claimed is:

1. An optical disc being writable by using a recording format, the recording format comprising a main code and a subcode, the optical disc comprising:
    a program area where program information is recorded in the form of the main code and control information for controlling replaying of recorded information on the optical disc is recorded in the form of the subcode, the control information including table information representing a table of contents of the program information in the form of the subcode; and a lead area formed adjacent to the program area where table information representing the table of contents of the program information is recorded in the form of the subcode and mastering data for mastering the information recorded on the optical disc is recorded in the form of the main code.

2. An optical disc as defined in claim 1 wherein the lead area has a main channel area and the mastering data is recorded in the main channel area of the lead area.

3. An optical disc as defined in claim 1 wherein the lead area is a lead-in area formed inside of the program area.

4. An optical disc as defined in claim 1 wherein the lead area is a lead-out area formed outside of the program area.

5. A method for recording data on an optical disc which is writable by using a recording format, the recording format comprising a main code and a subcode, and the optical disc having a program area and a lead area as a writable area, the optical disc recording method comprising the steps of:

recording in the program area program information in the form of the main code and control information for controlling replaying of recorded information on the optical disc in the form of the subcode;

recording in the lead area a part of control information in the form of the subcode, the part of control information being table information representing a table-of-contents of the program information;

generating mastering auxiliary information necessary for performing mastering of the optical disc on the basis of the control information;

storing in a memory device the mastering auxiliary information; and recording the mastering auxiliary information stored in a memory device, in the form of the main code in the lead area.

6. An optical disc recording device for recording data on an optical disc which is writable by using a recording format, the recording format comprising a main code and a subcode, and the optical disc having a program area and a lead area as a writable area, the optical disc recording device comprising:

first recording control means for recording in the program area program information in the form of main code and control information for controlling reproduction of the optical disc in the form of the subcode, and for recording in the lead area at least a part of control information in the form of the subcode, the part of control information being table information representing a table-of-contents of the program information;

auxiliary information storing means for generating mastering auxiliary information necessary for performing mastering of the optical disc on the basis of the control information, and for storing in a memory device the mastering auxiliary information; and second recording control means for recording in the lead area the mastering auxiliary information stored in a memory device, in the form of the main code in the lead area.

7. A method of recording data on an optical disc using a recording format comprised of a main code and a subcode, comprising the steps of:

recording, in a program area of the optical disc, program information in the form of the main code and control information for controlling replaying of recorded information on the optical disc recorded in the form of the subcode, the control information including table information representing a table of contents of the program information in the form of the subcode;

recording in a lead area formed adjacent to the program area a part of control information in the form of table information representing the table of contents of the program information in the form of the subcode; and recording mastering auxiliary information, necessary for performing mastering of the optical disc, in the form of the main code, in the lead area.

8. The method in accordance with claim 7, wherein the step of recording mastering auxiliary information includes the steps of generating the mastering auxiliary information on the basis of the control information and storing the mastering auxiliary information.

* * * * *